(12) United States Patent
Balduin et al.

(10) Patent No.: US 6,342,116 B1
(45) Date of Patent: Jan. 29, 2002

(54) PROCESS FOR LAMINATING LAMINATED GLAZING ASSEMBLIES

(75) Inventors: Michael Balduin, Alsdorf; Hubert Havenith, Würselen; Michael Labrot, Aachen, all of (DE)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/492,455

(22) Filed: Jan. 27, 2000

(30) Foreign Application Priority Data

Jan. 27, 1999 (DE) .......................... 199 03 171

(51) Int. Cl.⁷ .............................................. C03C 27/12
(52) U.S. Cl. ..................... 156/106; 156/104; 156/109; 156/285; 156/286
(58) Field of Search .................. 156/99, 103, 104, 156/106, 107, 109, 285, 286; 52/786.1, 786.11, 786.12; 428/34

(56) References Cited

U.S. PATENT DOCUMENTS 4,152,188 A * 5/1979 Friedrich et al. ........... 156/212
5,028,287 A * 7/1991 Herliczek et al. ............. 156/99
5,196,676 A * 3/1993 Hallahan .................... 219/388

FOREIGN PATENT DOCUMENTS

FR 2206289 * 6/1974

* cited by examiner

*Primary Examiner*—Jeff H. Aftergut
*Assistant Examiner*—Jessica Rossi
(74) *Attorney, Agent, or Firm*—Oblon, Spivak, McClelland, Maier & Neustadt, P.C.

(57) ABSTRACT

A process for laminating multi-layer pre-forms into laminated glazing assemblies is provided. The pre-forms are first subjected to a vacuum in an inlet lock. Then, the pre-forms are heated to an assembly or bonding temperature in a heating chamber, while still being subjected to vacuum. Next, the pre-forms are pressed using pressing pieces in a pressing chamber, which is also subjected to vacuum. A greater pressure is exerted along the edges of the laminated glazing assemblies so as to bond the edges, preferably by using membranes. In an outlet lock which follows the pressing chamber, the laminated glazing assemblies are again vented to atmospheric pressure. An apparatus suitable for carrying out the process is also provided. The apparatus has chambers which are connected together by conveyors so as to achieve a quasi-continuous flow of material.

9 Claims, 2 Drawing Sheets

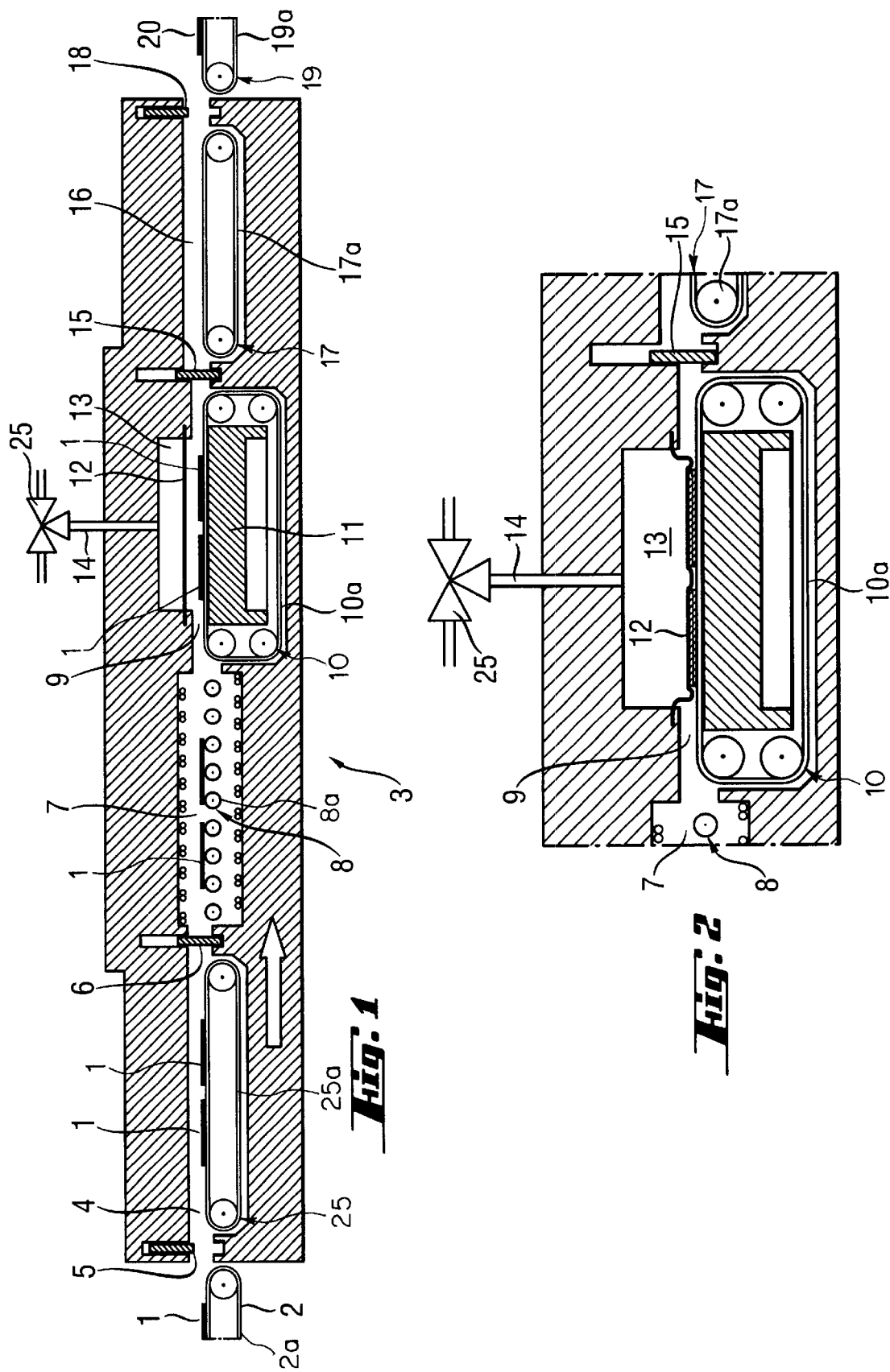

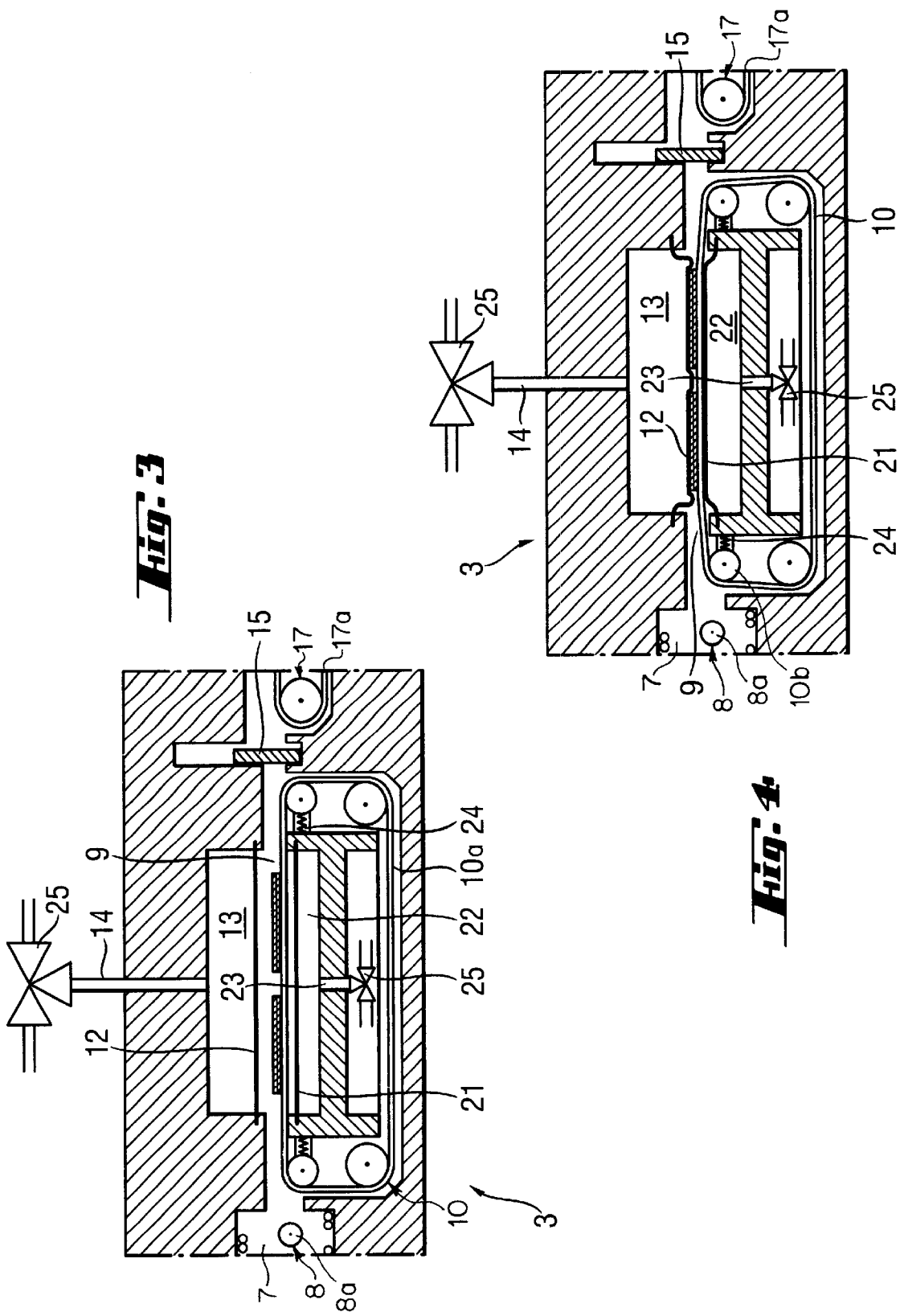

PROCESS FOR LAMINATING LAMINATED GLAZING ASSEMBLIES

FIELD OF THE INVENTION

The present invention relates to a process and an apparatus for laminating pre-forms into laminated glazing assemblies, wherein the pre-forms include two solid panes laid on top of each other with a layer of adhesive in between such that the two solid panes with the layer of adhesive in between are subjected to pressure and temperature differences to form the laminated glazing assembly.

BACKGROUND OF THE INVENTION

The expression "laminated glazing assemblies" should be understood here to mean multi-layer products which consist of at least two solid panes with an adhesive film in between. The adhesive film is made of plastic or similar material for joining the two solid panes together. The two solid panes may both be made of glass or may both be made of plastic. However, it is also possible for a glass pane and a plastic pane to be joined together by an adhesive film. The individual layers (i.e., the solid panes and the layers or films of plastic) are produced separately in a conventional manner. The individual layers are then layered on top of each other to form of a packet of layers (i.e., a "pre-form"), before a final assembly into a laminated glazing assembly.

Modern glazing assemblies made of laminated glass, such as windscreens and side windows in motor vehicles, are often finally laminated in large autoclaves at high pressure and high temperature. Because of the necessary increase in pressure and of the long residence time required, a process using an autoclave step slows down the continuous and highly mechanized sequence of operations in the manufacture of the laminated glass assemblies, which has already been achieved for the manufacture and conversion of the individual layers for forming the pre-forms.

However, processes have also already been described for the manufacture of laminated glass which dispense with the autoclaving for the final bonding. In these autoclave-less processes, the pre-forms are finally bonded at atmospheric pressure.

German Patent No. 2,209,642 (hereinafter "the DE '642 patent") describes a process for manufacturing three-layer laminated-glass glazing assemblies. During the process of the DE '642 patent, the pre-forms are put under vacuum and heated in a chamber, while the intermediate spaces are simultaneously subjected to vacuum using a suction frame. After having reached a certain temperature, for example, 100° C., the chamber is again vented to atmospheric pressure. However, the lateral vacuum is maintained by the suction frame, which continues to create a vacuum. Consequently, a primary laminate is simply assembled temporarily. This primary laminate is then transferred, with the suction frame under vacuum, into another chamber which is at atmospheric pressure. In the atmospheric pressure chamber, the primary laminate is heated to a temperature above the melting point of the adhesive film, which has been placed between the two solid panes. The pressure difference between the outside and the inside is sufficient to form the final laminated assembly.

German Patent No. 3,044,717 (hereinafter "the DE '717 patent") describes another autoclave-less process for the manufacture of two-layer laminated products having a thermoplastic sheet located on the outside. According to the process of the DE '717 patent, a chamber at ambient pressure receives the pre-form. The ambient pressure chamber has its pressure temporarily decreased to a pressure even lower than the internal pressure obtained between the layers of the pre-form. The pressure may be reduced with the aid of a suction frame. The pressure difference briefly separates the layers from each other so as to facilitate the outgassing of the intermediate space. Next, the entirety of the pre-form is heated to the bonding temperature. During the time the pre-form is heated to the bonding temperature, the pressure in the chamber is increased back up to ambient pressure so as that the final laminated glazing assembly results and the internal pressure within the pre-form remains below atmospheric.

The two above-described autoclave-less processes rely on separable vacuum systems and also require a suction frame for sealing the packet of layers around the edge. The edge sealing is done, not only during the phase when the pre-form is under vacuum, but also during the subsequent phase wherein the final laminated glazing assembly is produced at atmospheric or higher pressure. For each shape and/or size of the pre-form, depending on the case, a specific variant of the suction frame has to be used. Since positioning and removing the suction frame cannot presently be mechanized, the above-described autoclave-less processes cannot be incorporated into, or can only be incorporated insufficiently into, an at least quasi-continuous manufacturing line. The term "quasi-continuous" should be understood here to mean a sequence of operations during which the flow of product material takes place, in principle, continuously during certain pane cycle periods and must only be interrupted for a short time for certain conversion steps, for example, for pressing between membranes or other pressing molds.

German Reference No. 2,424,085 (hereinafter "the DE '085 reference") also describes an autoclave-less process during which a plastic film is laminated onto a pane using pressing membranes. In order to carry out the process of the DE '085 reference, the pane and the film are placed in a chamber so that the pane does not contact the film. Next, the chamber is closed and a vacuum is created therein. The plastic film rests on a membrane forming a wall of the chamber. The membrane is subjected to vacuum on both sides (i.e., on a front and rear face away from the chamber). After a necessary vacuum has been obtained in the chamber, the rear face of the membrane is subjected to atmospheric pressure. Because of the pressure difference established, the membrane presses the film against the pane. The film is made of either self-adhesive plastic or is provided with an adhesive layer. In this way, it is possible to produce curved glazing assemblies made of laminated glass. The curved laminated glazing assemblies are then pressed in a similar manner between two membranes.

When a heat-activatable adhesive is used, the pane is pre-heated outside of the chamber and then placed in the chamber. This process has the advantage that both a suction frame and individual pressing molds may be dispensed with.

Finally, German Reference No. 19,712,145 (hereinafter "the DE '145 reference") describes another laminating process during which a pre-form, consisting of two panes and an adhesive film interlayer, is heated to the assembly temperature. The pre-form is then transferred into a chamber and a vacuum is created therein. PVB adhesive films are usually employed for the manufacture of glazing assemblies of the DE '145 reference. The PVB adhesive films are usually made of laminated glass which has a relatively rough and non-transparent surface so as to guarantee that, after the solid panes and the adhesive film have been joined together, all the air can be sucked out through the channels formed by the unevenness in the film. In order to obtain the required high transparency of the final product, the adhesive film must be fully melted so that the unevenness completely disappears. In the process of the DE '145 reference, after the minimum pressure has been obtained and after sufficient venting, the edge of the pre-form is sealed by mechanical pressing, while the chamber is vented again. Under the action of forces exerted on the main surfaces of the laminated product, preferably in combination with additional heating in order to completely melt the adhesive film, the rise in pressure causes the panes to be joined to the adhesive film so that a virtually continuous flow of material can be achieved.

SUMMARY OF THE INVENTION

The objective of the present invention is to provide an apparatus and process for laminating pre-forms into laminated glazing assemblies, wherein at least a quasi-continuous flow of material is achieved for laminated glazing assemblies of variable outlines and sizes.

The above-described objective is achieved according to the present invention by providing a process for laminating pre-forms into laminated glazing assemblies by using the effect of pressure and heat differences on the superposed layers of the pre-forms in order to form the laminated glazing assemblies. The process comprising the steps of: subjecting the pre-forms to an overall vacuum by lowering the ambient pressure; maintaining the ambient vacuum, while both heating the pre-forms to a temperature necessary for joining the glass to the plastic and pressing the pre-forms between flexible pressing pieces in order to form the laminated glazing assemblies; and increasing the ambient pressure to atmospheric pressure by venting the laminated glazing assemblies.

During the step of subjecting the pre-forms to the overall vacuum, the temperature of the pre-forms is not yet increased or in some cases, is increased only slightly. Thus, any premature bonding is avoided so that the laminated glazing assemblies do not have any air inclusions therein and thus, it is not necessary to scrap the defective laminated glazing assemblies so as to reduce the efficiency of the process.

The second and third step of heating the pre-forms to a temperature necessary for joining the glass to the plastic and pressing the pre-forms between flexible pressing pieces in order to form the laminated glazing assemblies (both while maintaining vacuum), makes it possible to dispense with a suction frame for the pre-forms. During the heating step, the pre-forms are heated to a temperature necessary to join the glass to the plastic. An adhesive film of polyvinylbutyral (i.e., "TVB"), which is used for most multi-layer laminated glazing assemblies, melts at approximately 130° C. When the layer of adhesive is of another plastic other than PVB, the layer of adhesive may be on the outside of the solid panes, may be a heat-activatable adhesive between the solid panes, and is usually of a type having a melting point less than 130° C.

The cycle time of the process and of the corresponding apparatus is essentially determined by the time required for the pre-form to be subjected to vacuum during the initial step. This cycle time has been found sufficient to heat the pre-form to the required temperature during the heating step. It also allows enough time for the pressing step, which may require the material between the pressing pieces to be immobilized, at least for a short period of time lasting a few seconds.

The rapid final cooling of the laminated glazing assembly to normal temperatures, which occurs after the exit shutter is opened, is not critical when the solid panes are glass because the assembly temperatures are also significantly below the usual pre-tensioning temperatures.

Preferably, the pre-form is reheated, in any known manner, so as to completely melt the structure of the film to assembly the laminated glazing assembly.

In order to achieve a high efficiency, the various steps, namely the evacuation, heating, pressing and venting, are carried out in successive physically separate chambers, wherein the heating chamber and the pressing chamber always remain under vacuum.

The level of vacuum created in the heating chamber and the pressing chamber is approximately 1 to 10 hPa of absolute pressure. The entry temperature of the pre-form is brought to approximately 50° C. by pre-heating the pre-form. Thereafter, in the apparatus, the heating rate is set to approximately 2° C./second until the usual assembly temperature of 130° C. is reached. The cycle time of a complete cycle is about 15 seconds, this being imposed by the prior and subsequent processes. The pressing time itself is only about 5 seconds.

Even when taking into account the reheating of the pre-form in order to form the final laminated glazing assembly, the total times for manufacturing laminated glazing assemblies according to the process of the present invention are appreciably shorter than the values of approximately 2.5 hours that are achieved with the autoclaving process.

The flexible pressing pieces used in the pressing step are most likely conventional membranes. Therefore, the plant does not require pressing molds of any one specific type, which are set for certain glazing models. Laminated glazing assemblies of different outlines and sizes can be treated directly, one after another, without having to modify the plant and therefore, without any down time.

Flat pre-forms may be pressed between a membrane and a flat and solid bearing surface, whereas curved glazing pre-forms are preferably pressed in a conventional manner between two membranes that can be pressed on both sides in order to carry out the final assembly. Of course, flat pre-forms may also be pressed by two membranes in a pressing chamber.

In all cases, during the pressing of the pre-forms, the pre-forms may rest on a conveyor belt assembly in the pressing chamber. The conveyor belt, of the conveyor belt assembly, transfers the pressing or reaction forces to the main surface of the pre-form facing the conveyor belt.

Of course, it is also possible to use other pressing pieces such as, for example, resilient rollers. However, pressing membranes transfer the pressing effect over the entire surface of the pre-form in the most homogeneous manner. The pressing membranes also adapt best to the surfaces and sizes of different glazing assemblies. However, care has to be taken to ensure that the pre-forms to be pressed are always entirely covered by the membranes. The size of the pre-forms that can be converted therefore depends directly on the membrane area available. In all cases, the pressing pieces are required to provide a covering, which reliably prevents adhesion of the glass or of the plastic, in a conventional manner.

The pressing membranes may be subjected to atmospheric pressure on the opposite side from the pre-form because there is a vacuum inside the pressing chamber. In all cases, this pressure difference is enough to generate sufficiently high assembly forces. It is therefore possible, in principle, to avoid the need for and the use of a high-pressure generator.

During the venting of the laminate, in order to prevent air from getting back into the laminated product, it is necessary, in principle, to find a way to bond the edges in a manner similar to the process mentioned in the DE '145 reference. When membranes are used that have working areas which extend beyond the edges of the pre-forms on all sides thereof, a greater force is exerted on the edges of the pre-forms during pressing to result in sufficient bonding of the edges. This is especially so because the adhesive film reaches its melting point along the edges rather than in the middle of the surface. The vacuum created is as if it were trapped in the laminate.

BRIEF DESCRIPTION OF THE DRAWING FIGURES

Further details and advantages of the subject matter of the present invention will be evident from the drawing figures of the two illustrative embodiments which are described, as follows:

FIG. 1 is a cross-sectional view of a first embodiment of the present invention of an entire autoclave-less apparatus for the manufacture of flat laminated glazing assemblies;

FIG. 2 is a cross-sectional view showing the details of the pressing chamber of the apparatus of FIG. 1, wherein a membrane is used as the pressing piece and the membrane is shown in a working position;

FIG. 3 is cross-sectional view showing a second embodiment of the pressing chamber of FIG. 2, wherein the pressing chamber is particularly for the manufacture of curved laminated products such that the pressing chamber includes two membranes shown in the rest position; and FIG. 4 is a cross-sectional view showing the pressing chamber of FIG. 3 in a working position.

DETAILED DESCRIPTION OF THE PREFERRED EMBODIMENTS

Referring to FIG. 1, a laminated glazing assembly apparatus 3 for laminating pre-forms 1 into laminated glazing assemblies 20 is shown. The pre-forms 1 include pre-assembled panes and interlayer films. The pre-forms 1 are conveyed on a conveyor belt 2a of a first conveyor belt assembly 2 to the laminated glazing assembly apparatus 3. The laminated glazing assembly apparatus 3 runs from the left to the right of FIG. 1. The pre-forms 1 are first transferred into an inlet lock 4 via a conveyor belt 2.5a of a second conveyor belt assembly 2.5. The inlet lock 4 serves as an input station and may be hermetically sealed on the inlet side (i.e., on the left) by a shutter 5 and on the outlet side by a shutter 6. The inlet lock 4 may be subjected to vacuum and then vented using a system of pipes (not shown). The shutters 5 and 6, just like the conveyor belt assemblies 2 and 2.5, are motor-driven and coordinated by a central controller (not shown). The shutter 6 seals off the inlet lock 4 from a heating chamber 7, which is located downstream of the inlet lock 4. The heating chamber 7 includes electrical (radiative) heating elements. However, the heating chamber 7 may instead by heated by convective heating. During the operation of the plant, the heating chamber 7 always remains under a vacuum of a predetermined level. Inside the heating chamber 7, the pre-forms 1 are preferably transported on whatever type of conveyors guarantees effective action of, either the radiative heating or the convective heating, if required, on all sides. The conveyors may be, for example, a conveyor assembly having several narrow conveyor belts. However, FIG. 1 shows the pre-forms 1 as being moved via rollers 8a of a roller conveyor 8 through the heating chamber 7.

The heating chamber 7 is followed by a pressing chamber 9. Throughout the operation of the plant, the pressing chamber 9, similarly to the heating chamber 7, always remains under vacuum. The vacuum in the heating chamber 7 and in the pressing chamber 9 will always be the same so that it is not necessary for the heating and pressing chambers 7, 9 to be pressure-separated or decoupled. The temperature may also be the same in the heating and pressing chambers 7, 9. Heat may be provided to the pressing chamber 7, if required, via any suitable heating means such as, for example, a hot-air blower (not shown). A remotely controllable shutter (not shown) may also be provided, if necessary, between the heating and pressing chambers 7, 9.

The pre-forms 1 advance through the pressing chamber 9 on a conveyor belt 1(a of a third conveyor belt assembly 10. The third conveyor belt assembly 10 is guided over a bearing surface 11. In the first embodiment shown in FIG. 1, the bearing surface 11 serves as a passive lower pressing piece for the flat pre-forms 1. A membrane 12 is located above the conveyor belt assembly 10 in the roof of the pressing chamber 9. The membrane 12 constitutes an active upper pressing piece.

A working chamber 13 is located above the membrane 12. The working chamber 13 is hermetically isolated from the pressing chamber 9 by the membrane 12. The working chamber 13 may be subjected alternately to vacuum and to atmospheric pressure (or higher pressure, if required), via a system of pneumatic pipes 14 and suitable valves 25. The vacuum available in the working chamber 13 must be slightly higher than the vacuum in the pressing chamber 9 so that the membrane 12 can be reliably raised into the roof of the pressing chamber 9, after each pressing or venting operation.

A separating force or a lifting force (not shown), depending on the case, may be produced by the intrinsic elasticity of the membrane 12 or by suitable springs 24 or other suitable energy-storage devices (not shown).

On the output side (i.e., to the right in FIG. 1), the pressing chamber 9 may also be hermetically isolated by a shutter 15 of an outlet lock 16. The outlet lock 16 is located downstream of the pressing chamber 9. A fourth conveyor belt assembly 17 having a conveyor belt 17a is provided in the outlet lock 16 for transporting the laminated glazing assemblies 20. On the output side, the laminated glazing assemblies 20 may be isolated from the environment by a shutter 18. In a conventional manner, a fifth conveyor belt assembly 19 having a conveyor belt 19a transports the finished laminated glazing assemblies 20 to a tunnel oven (not shown). The laminated glazing assemblies 20 reside in the tunnel oven (not shown) for a prolonged period of time, such as about 1 hour or less, at an ambient temperature of about 130° C.

During entry of the pre-forms 1 into the inlet lock 4 on the first conveyor belt assembly 2, the shutter 5 (on the left in FIG. 1) of the inlet lock 4 is open and the shutter 6 (on the right in FIG. 1) of the inlet lock 4 is closed. After a plurality of pre-forms 1 has been introduced into the inlet lock 4, the shutter 5 is then closed so that the inlet lock 4 may be subjected to vacuum. When the vacuum in the inlet lock 4 is at the same level as the vacuum in the heating chamber 7, the shutter 6 is opened. The shutter 6 may be operated more easily by establishing a direct pressure compensation via a switchable shunt pipe (not shown) before opening the shutter 6. The plurality of pre-forms 1 are transferred into the heating chamber 7 and then, the shutter 6 is closed again. The inlet lock 4 can now be vented and then, after opening the shutter 5, can accept the next plurality of pre-forms 1. It goes without saying that, during the operation of the laminated glazing assembly apparatus 3, the two shutters 5 and 6 are never open at the same time.

The plurality of pre-forms 1 within the heating chamber 7 are heated up to the melting point of the adhesive film or, depending on the type of adhesive used, until the melting point is approximately reached. If the heating chamber 7 is long enough, the pre-forms 1 are then transported further by the rollers 8 of the roller conveyor during the heating step. The pre-forms 1 are then transferred onto the third conveyor belt assembly 10 of the pressing chamber 9 without modifying the pressure level or the temperature. If required, the pre-forms 1 are correctly positioned on the bearing surface 11 beneath the membrane 12 using a positioning system (not shown). The outlet shutter 15 of the pressing chamber 9 is now closed, as is the shutter 6. There is still vacuum in the working chamber 13, at a position located above the membrane 12. The third conveyor belt assembly 10 stops and the pressure in the working chamber 13 is rapidly increased. The pressure difference which is established presses the entire area of the membrane 12 against the upper faces of the heated pre-forms 1, as shown in FIG. 2. The pre-forms 1 are pressed against the bearing surface 11 via the conveyor belt of the conveyor belt assembly 10. The pressure exerted is sufficient for all the layers of the pre-forms 1 to be solidly joined together. More particularly, a greater pressure is exerted on the edges of the pre-forms 1. After the prescribed pressing time of a few seconds, a vacuum is again created in the working chamber 13 and again the membrane 12 is lifted up to the roof of the pressing chamber 9 so that the pressed laminated glazing assemblies 20 are released. Before opening the shutter 15 to expel the pressed laminated glazing assemblies 20 into the outlet lock 16, the outlet shutter 18 of the outlet lock 16 must be closed and the outlet lock 16 must be subjected to vacuum at the vacuum level in the pressing chamber 9. If necessary, the proper lever of vacuum in the outlet lock 16 may be achieved using a switchable shunt pipe (not shown). The laminated glazing assemblies 20 are now transferred by the conveyor belt 10a of the third conveyor belt assembly 10 onto the conveyor belt 17a of the fourth conveyor belt assembly 17, which is in the output lock 16. When the transfer is complete, the shutter 15 is again closed and the output lock 16 is vented to atmosphere.

If a vacuum is created in the heating chamber 7 and in the pressing chamber 9 via the systems for creating a vacuum in the inlet and outlet locks 4, 16, the shutters 6, 15 will be closed, during the operation of the plant, only for the time during which the pressure level in the inlet and outlet locks 4, 16 is greater than the working pressure in the heating and pressing chambers 7, 9. Therefore, only during the introduction and discharge of the plurality of pre-forms 1 or the laminated glazing assemblies 20, as the case may be. The handling capacity of the plant may be comparatively improved if suitable means for maintaining the vacuum are also provided in the heating and pressing chambers 7, 9.

In order to guarantee uniform cycle times, the number of pre-forms 1 or laminated glazing assemblies 20, as the case may be, which can be accepted into the various stations will be sized in the same way. In other words, the inlet and outlet locks 4, 16 and the pressing chamber 9 will each be able to accept an equivalent number of pre-forms 1 or laminated glazing assemblies 20, as the case may be. The heating chamber 7 or the rollers 8a of the roller conveyor 8 which is provided in the heating chamber 7 may, in principle, operate continuously via either a sufficient length of the heating chamber 7 or a slower transfer rate of the pre-forms 1. In order to reduce the length of the heating chamber 7, the inlet lock 4 could already be equipped with heating elements (not shown).

If necessary, special measures will be taken to remove any broken-glass debris from the surface of the conveyor belt 10a of the third conveyor belt assembly 10 and from the lower face of the membrane 12. Removal of the broken-glass debris from either the surface of the conveyor belt 10a of the third conveyor belt assembly 10 or from the lower face of the membrane 12 may be accomplished, for example, by a brush (not shown). In such a case, the brush would most likely be placed near the lower side of where the conveyor belt 10a runs.

In the alternative embodiment of the pressing chamber 9 as is shown in FIG. 3, the main difference from the embodiment shown in FIGS. 1 and 2 is that a second membrane 21 is provided as an active lower pressing piece in addition to the membrane 12. The second membrane 21 lies beneath the third conveyor belt assembly 10 and replaces the bearing surface 11. In order to actuate the second membrane 21, a second working chamber 22 is provided. The second working chamber 22, like the working chamber 13, may be subjected alternately to a vacuum and to atmospheric or higher pressure via a system of pipes 23 and may be hermetically isolated from the pressing chamber 9 by the membrane 21. The pressure in the two working chambers 13 and 22 will generally be controlled in a synchronous manner. However, the pressure in the working, chambers 13 and 22 may also be controlled independently of each other in a predefined sequence of operations over time.

Normally, the two working chambers 13 and 22 are under vacuum and therefore, the pressing pieces are in the rest position. In this state, the third conveyor belt assembly 10 is freely accessible for transporting the pre-forms 1 that are to be pressed or the laminated glazing assemblies 20 that have been pressed, as the case may be. Preferably, the lower membrane 21 does not rest on its lower face at this time so as to minimize rubbing and wear. Also, it is preferable that there is no sliding contact between the upper membrane 12 and the laminated glazing assemblies 20.

After positioning the heated pre-forms 1, which may be slightly curved, for example for the side windows of vehicles having a cylindrical curvature and made of laminated safety glass, between the two membranes 12 and 21. The two working chambers 13 and 22 are vented. Then, the situation illustrated in FIG. 4 is established. In other words, the membranes 12 and 21 both grip the pre-forms 1 to produce a surface pressing force along two sides and the edges of the membranes 12 and 21. Thus, in the embodiment shown in FIG. 4, the third conveyor belt assembly 10 can present only the least possible resistance to the full-area matching the possibly curved glazing surface facing it. In this case, a tensioning device 24 is shown, particularly on one of the idler rollers 10b allowing the third conveyor belt assembly 10, which is pre-tensioned, to move elastically away during lifting by the lower membrane 21. The membranes 12 and 21 themselves must also be sufficiently flexible to match the full-area shape.

Thus, in a manner similar to FIG. 2, a surface pressing load is applied to the heated pre-forms 1 subjected to vacuum. The vacuum is maintained for a time long enough for the desired full-area bonding of the individual layers of the pre-forms 1 to be achieved. The flexibility of the membranes 12 and 21 is used to obtain a greater pressing force along the edges of the pre-forms 1 and thus, in particular, to achieve reliable bonding of the outer edge of the pre-forms 1 into the laminated glazing assemblies 20. This again prevents any air from entering between the layers of the laminated glazing assemblies 20, when the laminated glazing assemblies 20 is again subsequently vented to atmospheric pressure.

It has been found from experimentation that a layer of adhesive, which is particularly well-adapted to the above-described process of laminating a pre-form I into a laminated glazing assembly 20 because the adhesive layer allows for better draining of air, has a roughness more important in value than an usual adhesive layer. More particularly, a preferred layer of adhesive has an average roughness Rz ranging from between 80 μm to 140 μm, and even more preferably ranging from 100 μm to 110 μm. A particularly favorable adhesive layer has been found to be a PVB film having characteristics, measured according to the norm DIN 4768, as follows:

TABLE 1

|  | SIDE 1 | SIDE 2 |
|---|---|---|
| Ra/μm | 18.46 | 16.01 |
| Rz/μm | 112.42 | 96.86 |
| Rmx/μm | 134.32 | 108.75 |
| RSm/μm | 948.05 | 675.12 |

TABLE 2

|  | SIDE 1 | SIDE 2 |
|---|---|---|
| Ra/μm | 18.36 | 17.51 |
| Rz/μm | 111.09 | 102.86 |
| Rmx/μm | 132.99 | 115.25 |
| RSm/μm | 1560.51 | 1112.86 |

The measures in Table 1 are realized according to the material direction (i.e., extrusion direction) and the measures in Table 2 are realized according to a direction perpendicular to the material direction. In each of Table 1 and Table 2, the measures are realized on both sides.

Such PVB films, which have a roughness more important in value than the usual adhesive layer, are obtained by extrusion and are submitted to a thermal treatment such as, for example, cooling and/or to a mechanical treatment such as, for example, a lamination with engraved rollers.

In this configuration, it goes without saying that control of the membranes 12 and 21 by varying the pressure in the working chambers 13 and 22 requires greater attention than when pressing flat pre-forms 1 against a solid bearing surface 11.

We claim:

1. A process for laminating a pre-form, wherein said pre-form includes at least first and second solid panes superposed with respect to each other and having a layer of adhesive in between such that said pre-form is to be subjected to both pressure differences and heat differences, to form a laminated glazing assembly, said process comprising the steps of:

subjecting said pre-form to an overall vacuum by lowering an ambient pressure;

heating said pre-form to a predetermined temperature necessary to adhesively bond said at least first solid pane to said layer of adhesive, while maintaining said overall vacuum;

pressing said pre-form at said predetermined temperature using flexible pressing pieces to form said laminated glazing assembly, while maintaining said overall vacuum; and increasing said ambient pressure to atmospheric pressure by venting said laminated glazing assembly;

wherein said subjecting of said pre-form to said overall vacuum, said heating of said pre-form, said pressing of said pre-form, and said increasing of said ambient pressure to atmospheric pressure are each carried out in physically separate successive chambers, and wherein said heating of said pre-form and said pressing of said pre-form both take place in chambers which are permanently under vacuum.

2. The process according to claim 1, further comprising heating said laminated glazing assembly further so as to fully melt said layer of adhesive, after increasing said ambient pressure to atmospheric.

3. The process according to claim 1, wherein said heating of said pre-form is done in a heating chamber which is a tunnel oven with radiative heating elements.

4. The process according to claim 1, wherein said pre-form is pressed flat against a conveyor belt assembly so that a belt of said conveyer belt assembly transfers pressing forces to a main surface of said pre-form which faces said conveyor belt.

5. The process according to claim 1, wherein said layer of adhesive has an average roughness between 80 μm and 140 μm.

6. The process according to claim 1, wherein said pressing of said pre-form includes applying pressing forces by at least one movable membrane against one of main surfaces of said pre-form.

7. The process according to claim 6, wherein said pre-form is flat and said one of said main surfaces of said pre-form bears away from said at least one moveable membrane on a solid flat bearing surface.

8. The process according to claim 6, wherein when said pre-form has at least one curved solid pane and wherein said pressing forces are applied using said at least one movable membrane acting on said one of said main surfaces and at least a second movable membrane acting on a second of said main surfaces.

9. The process according to claim 6, wherein said pressing of said pre-form is such that said at least one movable membrane is subjected to at least atmospheric pressure on a face thereof and away from said pre-form.

* * * * *